3,419,522
NONGRAYING, NONYELLOWING POLYTETRA-
FLUOROETHYLENE MOLDING POWDER
Peter N. Plimmer, Parkersburg, W. Va., assignor to E. I.
du Pont de Nemours and Company, Wilmington, Del.,
a corporation of Delaware
No Drawing. Filed Nov. 22, 1965, Ser. No. 509,191
4 Claims. (Cl. 260—45.75)

ABSTRACT OF THE DISCLOSURE

A nonyellowing, nongraying polytetrafluoroethylene molding powder that is white when observed by transmitted light can be produced by modifying non-graying polytetrafluoroethylene molding powder by the incorporation into the molding powder of from 2–110 parts of a metal salt selected from the group of metal salts consisting of calcium nitrate, strontium nitrate, barium nitrate, lead nitrate, potassium nitrate, barium chlorate and barium perchlorate.

---

This invention relates to polytetrafluoroethylene molding powder, and more particularly, to nondiscoloring polytetrafluoroethylene molding powder which upon fabrication yields articles having improved light transmission characteristics.

The molding of polytetrafluoroethylene molding powder to solid articles involves high temperatures such as 350–380° C. for both ram extrusion and for sintering of a preform. At such temperatures, slight degradation of the molding powder occurs, which results in the formation of black specks and a grayish appearance in the article produced. These discolorations have been minimized by exposing the molded product in a heated state to air. Unfortunately, thick sections of material require an excessive time for the oxidative influence of the air to penetrate into the interior of the article, which interior many become exposed upon further shaping operations. The time disadvantage has been somewhat overcome by the treatment described in U.S. Patent 3,190,864 to Shipp et al., which describes the use of a compound that evolves oxygen at molding temperatures. The in situ production of oxygen, however, has the disadvantage of producing a porous article. In each of these treatments, the polymer degrades at molding temperature; and the oxygen treatment is intended to eliminate the visual effect of this degradation.

A preferred solution to the discoloration problem has been found which avoids the foregoing disadvantages. This solution involves chemically stabilizing the polymer before the molding powder is fabricated, whereby the degradation which is responsible for discoloration (grayness and black specks) does not occur to an extent which leads to such discoloration. The resultant molded article is thereby white when observed by reflected light. However, when the article is observed by light transmitted through it, the article takes on a yellowish color which is objectionable in certain applications.

The present invention involves the discovery of a modification of the chemically stabilized, non-graying (including non-specking) polytetrafluoroethylene molding powder so that the resultant fabricated article is also white when observed by transmitted light. This modification involves the incorporation into the molding powder of from 2–110 parts of certain metal salts which are stable at temperatures above 400° C. per million parts by weight of polymer. These certain metal salts are as follows: calcium nitrate, strontium nitrate, barium nitrate, lead nitrate, potassium nitrate, barium chlorate, and barium perchlorate, with barium nitrate being preferred.

The yellow color which appears in the articles molded from the nongraying polytetrafluoroethylene is not a degradation product which occurs as a result of the high temperatures of molding, because the chemically stabilized resin does not degrade under such heating. Moreover, the yellow color is present in the unheated molding powder as is evidenced by the appearance via transmitted light of room-temperature pressed preforms. Thus, the action of the certain metal salts is to remove color which is already present. This color removal is not accomplished by oxygen evolution since the certain metal salts do not decompose at molding temperatures.

To describe the invention in greater detail the nongraying polytetrafluoroethylene molding powders which are suitable for use in the present invention generally should have a weight average particle size of from 10–625 microns (wet sieve analysis ASTM D 1457–62T) and a total surface area per gram in the range of from 1–9 square meters.

The preparation of polytetrafluoroethylene molding powders is described in U.S. Patent No. 2,393,967 to Brubaker. Such molding powders are suitable for use in the present invention by modifying the polymerization procedure disclosed therein to polymerize the tetrafluoroethylene in the substantial absence, i.e., below 50 parts per million liquid weight of dissolved metal. The polymerization procedure of the patent is preferably modified further by polymerizing the tetrafluoroethylene in contact with a basic ammonium compound. Thus, the tetrafluoroethylene is polymerized in contact with a stirred aqueous medium substantially free of dissolved metal and containing a free radical initiator and sufficient basic ammonium compound to maintain the medium at a pH of at least 7. The basic ammonium compound should not possess any chain transfer activity. Suitable basic ammonium compounds include the water-soluble compounds as follows: ammonium biborate, ammonium carbonate, ammonium tetraborate, ammonium acid carbonate, and ammonium hydroxide. The amount of ammonium compound present should provide between 150–650 parts of ammnoium ion per million parts liquid weight (based on the weight of water present). As a variation to either modification of the Brubaker polymerization procedure, from 50 to 500 p.p.m., liquid weight, of a nucleating agent such as ammonium perfluoro-octanoate or caprylate can be present in the polymerization medium. The use of such nucleating agents and others which are suitable for use in the present invention is described in U.S. patent application Ser. No. 204,067, now U.S. Patent 3,245,972 filed June 21, 1962, to Anderson et al. The polytetrafluoroethylene resin produced under these conditions is converted to molding powder preferably by comminution at a temperature below 19° C. The molding powder can contain additives, such as inert fillers, e.g., milled glass fibers; and the resin can contain up to about 2% by weight of a combined comonomer, such as hexafluoropropylene added to increase the melt fabricability of or otherwise modify the polytetrafluoroethylene without losing its essential properties. The resultant molding powder can be fabricated at high temperatures by conventional procedures to yield articles which are nongraying and thereby white to reflected light.

The certain metal salt that is added to the nongraying polytetrafluoroethylene resins, so that the ultimate article produced therefrom is white to transmitted light as well (so long as the added inert filler, if any, does not make the article opaque), can be added to raw or moderately cut resin prior to reducing the particle size of the resin to a lower value. As a general procedure, the certain metal salt is added to water; and the resultant solution is slurried with the resin which is in the divided state desired. The addition of wetting agents or surfactants to the slurry is not required. It is preferred, however, to incorporate the metal salt into the resin at some stage during its manufacture in which the resin is still wet and has not yet ever been dried. Such manufacturing stage is the washing, wet cutting, or pelletization stages. Alternately, dried polytetrafluoroethylene molding powder can be taken from storage and slurried with the solution containing the certain metal salt. The metal salt slurried molding powder is then dewatered and dried before use in conventional molding fashion.

Based on the amount of water remaining in the molding powder after dewatering, one can determine the proper concentration of metal salt in the slurry in order to achieve a parts per million concentration of the metal salt based on the weight of polymer within the range of 2–110 p.p.m. Less than two parts per million does not give any significant effect on the yellowness of the shaped article when observed through transmitted light, while greater than 110 parts per million causes molecular weight degradation of the polymer during molding, resulting in poorer physical properties for the molded product. The amount of thermally stable metal salt which is most effective will depend on the particular metal salt employed and can be determined by routine experimentation, by observing the color of the shaped polytetrafluoroethylene article with transmitted light and by adjusting the amount of metal salt incorporated into the molding powder to get the whiteness desired. The activity of the metal salts disclosed appears to be highly selectively in that such compounds as barium hydroxide, barium chloride, potassium perchlorate, and lead chloride, do not work.

Examples of the present invention are as follows. Parts and percents are by weight unless otherwise indicated. In these examples, the general procedure for the preparation of the nongraying polytetrafluoroethylene molding powder was as follows: To an evacuated stainless steel polymerization vessel was added 65 parts of deoxygenated distilled water containing a concentration of 0.08 gram/mole per liter of ammonium carbonate and 41 parts per million of ammonium persulfate. The contents of the vessel were then heated to 67° C., pressurized with tetrafluoroethylene to 175 p.s.i.g., and stirred with a flat paddle agitator at an agitator speed of 600 r.p.m. The run was concluded when the desired concentration of polymer in the slurry was reached and 25.41 parts of polytetrafluoroethylene resin were recovered. This resin was comminuted in conventional fashion, generally by passing the resin through a "Fitzmill" Model K–14, operated at about 4300 r.p.m. to reduce the weight average particle size of the resin to about 300μ as measured by wet sieve analysis. Alternatively, the resin from the "Fitzmill" may be further reduced to a weight average particle size of about 20μ in a conventional manner using the fluid energy mills described in Perry's Chemical Engineers Handbook, McGraw-Hill, vol. 4, Sec. 8, pages 42 and 43, such as the "Jet-o-mizer," "Micronizer," "Majac Jet Pulverizer," "Gem Mill," or a "Beater Mill," using the technique described in U.S. Patent No. 2,936,301. In the latter comminution, it is preferred to maintain the resin temperature below 19° C. The resultant powder was placed in trays and dried for about 16 hrs. at a temperature of about 120° C. The powder, i.e., articles produced therefrom was nongraying upon sintering or ram extrusion at temperatures of 350–380° C.

EXAMPLE I

To 100 lbs. of water was added 0.3 gm. of barium nitrate and 10 lbs. of nongraying polytetrafluoroethylene molding powder having a weight average particle size of 300μ. The resultant slurry was stirred using a flat paddle agitator for 15 min., after which time the wet powder, carrying 30% moisture on a dry basis, was scooped from the tank and tray dried at 150° C. for 10 hrs.

The dry powder was pressed at room temperature into a mold having an annular cavity. The resultant preform was sintered in an air oven at 380° C. for 3 hrs. and subsequently cooled at 1° C. per min. to 300° C. prior to removal from the oven. After cooling to room temperature, the sintered article was white when viewed with reflected light and free from spotty contamination. When viewed from the opposite side of a light source, the article was also white. A control article fabricated from $Ba(NO_3)_2$-free resin from the same source and under identical conditions was white when viewed by reflected light, but extremely yellow when viewed by transmitted light.

Barium analysis by X-ray fluorescence confirmed that the dry resin contained 2.5 p.p.m. of $Ba(NO_3)_2$ as calculated from the amount of water retained by the resin after slurrying it in the barium nitrate solution.

EXAMPLE II

Example I was repeated except that 40 gm. of barium nitrate was used instead of 0.3 gm. and the non-graying polytetrafluoroethylene molding powder had a weight average particle size of 15μ to yield a sintered article which was white when viewed by either reflected light or transmitted light. X-ray fluorescence analysis showed that the resin contained 106 p.p.m. of barium nitrate.

EXAMPLES III THROUGH V

In each of the following examples, 10 lbs. of wet granular nongraying polytetrafluoroethylene resin was added to 100 lbs. water; and the thermally stable soluble metal salt was then added (see table). Agitation proceeded at 380 r.p.m. for 15 min., after which time the wet polymer was removed from the tank and tray dried at 150° C. for 10 hrs. in an air-circulating oven. The average amount of salt-bearing water remaining with the resin prior to drying was from 20–30%.

| Example | Salt | Amount (gram) | Salt retained [1] | Visual appearance under transmitted light |
|---|---|---|---|---|
| III | Barium chlorate | 4 | 12 | White. |
| IV | Calcium nitrate | 4 | 12 | Do. |
| V | Potassium nitrate | 4 | 21 | Do. |

[1] P.p.m. (from X-ray fluorescence analysis).

EXAMPLE VI

This example shows the relation between the weight loss upon prolonged heating of nongraying polytetrafluoroethylene molding powder, and the same powder containing various amounts of $Ba(NO_3)_2$. Nongraying polytetrafluoroethylene molding powder having a weight average particle size of 300 microns was spread uniformly on drying trays and heated at 380° C. for 18 hours. The weight lost by the powder was determined by comparing its weight before and after heating. This procedure was repeated for the same powder having varying amounts of $Ba(NO_3)_2$ incorporated therein according to the procedure of Example I. Details of the compositions of the molding powder and weight loss results are presented in the following table:

| $Ba(NO_3)_2$ (p.p.m.) | Percent wt. loss | Percent wt. loss per hour |
|---|---|---|
|  | 0.0086 | 0.0005 |
| 12 | 0.0138 | 0.0008 |
| 16 | 0.0167 | 0.0009 |
| 40 | 0.0351 | 0.0019 |

The weight loss of the molding powder which is free of $Ba(NO_3)_2$ is quite low. The presence of the $Ba(NO_3)_2$ in this powder has the effect of tending to increase its weight loss.

As many apparently widely different embodiments of this invention may be made without departing from the spirit and scope thereof, it is to be understood that this invention is not limited to the specific embodiments thereof except as defined in the appended claims.

What is claimed is:

1. Molding powder of nongraying polytetrafluoroethylene and from 2 to 110 parts per million based on the weight of said polytetrafluoroethylene of $Ca(NO_3)_2$, $Sr(NO_3)_2$, $Ba(NO_3)_2$, $Pb(NO_3)_2$, $KNO_3$, $Ba(ClO_3)_2$, or $Ba(ClO_4)_2$, wherein said polytetrafluoroethylene is prepared by polymerizing tetrafluoroethylene in an aqueous solution having a pH of at least 7 and containing a free radical initiator, from 150–650 parts per million, liquid weight of ammonium ion and less than 50 parts per million, liquid weight of dissolved metal.

2. In the process of molding polytetrafluoroethylene molding powder, which does not degrade at molding temperatures and produces a solid object which is free of grayness as viewed by reflected light but which has a yellow color as viewed by transmitted light, the improvement of conducting the step of molding with said molding powder having incorporated therein from 2 to 110 parts per million, based on the weight of said polytetrafluoroethylene of $Ca(NO_3)_2$, $Sr(NO_3)_2$, $Ba(NO_3)_2$, $Pb(NO_3)_2$, $KNO_3$, $Ba(ClO_3)_2$, or $Ba(ClO_4)_2$, whereby said solid object is free of said yellow color, wherein said polytetrafluoroethylene is prepared by polymerizing tetrafluoroethylene in an aqueous solution having a pH of at least 7 and containing a free radical iniator, from 150–650 parts per million, liquid weight of ammonium ion and less than 50 parts per million, liquid weight of dissolved metal.

3. The molding powder of claim 1 wheren the additive is $Ba(NO_3)_2$.

4. The process of claim 2 wherein the additive is $Ba(NO_3)_2$.

References Cited

UNITED STATES PATENTS

| 2,784,170 | 3/1957 | Walter | 260—45.9 |
| 3,085,083 | 4/1963 | Schreyer | 260—87.5 |
| 3,190,864 | 6/1965 | Shipp et al. | 260—92.1 |

OTHER REFERENCES

Modern Plastics Encyclopedia, 1964 edition, Sci. Lib. TP 986 A M5, p. 191.

DONALD E. CZAJA, *Primary Examiner.*

V. P. HOKE, *Assistant Examiner.*

U.S. Cl. X.R.

260—45.7, 92.1